United States Patent
Jaworek et al.

(10) Patent No.: US 6,787,197 B1
(45) Date of Patent: Sep. 7, 2004

(54) METHOD FOR PRODUCING SCRATCH RESISTANT, WEATHERPROOF COATINGS

(75) Inventors: Thomas Jaworek, Kallstadt (DE); Reinhold Schwalm, Wachenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/049,641

(22) PCT Filed: Aug. 24, 2000

(86) PCT No.: PCT/EP00/08283

§ 371 (c)(1),
(2), (4) Date: Feb. 25, 2002

(87) PCT Pub. No.: WO01/14482

PCT Pub. Date: Mar. 1, 2001

(30) Foreign Application Priority Data

Aug. 25, 1999 (DE) .......................... 199 40 313

(51) Int. Cl.$^7$ .............................. B05D 7/00; C08F 2/48; C08F 2/46
(52) U.S. Cl. .................... 427/508; 427/407.1; 427/409; 427/514; 427/517; 427/518; 522/96
(58) Field of Search ................................ 427/508, 514, 427/517, 518, 384, 385.5, 388.1, 388.2, 407.1, 409; 522/96

(56) References Cited

U.S. PATENT DOCUMENTS

| | | | | |
|---|---|---|---|---|
| 4,133,723 A | * | 1/1979 | Howard | 427/519 |
| 4,439,600 A | * | 3/1984 | Moran, Jr. | 528/392 |
| 4,675,234 A | * | 6/1987 | Sachs et al. | 428/328 |
| 5,700,576 A | | 12/1997 | Brehm et al. | 428/412 |
| 6,007,966 A | * | 12/1999 | Lin | 430/281.1 |
| 6,146,288 A | | 11/2000 | Crast et al. | 473/377 |

FOREIGN PATENT DOCUMENTS

| | | |
|---|---|---|
| EP | 0 508 409 | 10/1992 |
| EP | 0 544 465 | 6/1993 |
| JP | 63-214375 | 9/1988 |
| JP | 05-179156 | 7/1993 |
| WO | 94 29398 | 12/1994 |

* cited by examiner

Primary Examiner—Elena Tsoy
(74) Attorney, Agent, or Firm—Oblon, Spivak, McClelland, Maier & Neustadt, P.C.

(57) ABSTRACT

A process for producing scratch-resistant coatings comprises applying at least one UV-curable coating composition comprising as its photochemically crosslinkable constituent at least one aliphatic urethane (meth)acrylate prepolymer PU having at least two double bonds per molecule, or a mixture of at least one urethane (meth)acrylate prepolymer PU and at least one reactive diluent, to the target substrate and curing the resulting wet coating by exposure to ultraviolet radiation under an inert gas atmosphere.

60 Claims, No Drawings

METHOD FOR PRODUCING SCRATCH RESISTANT, WEATHERPROOF COATINGS

The present invention relates to a process for producing scratch-resistant weathering-stable coatings on the basis of UV-curable coating compositions.

Coating compositions which cure by UV radiation are used in industry to produce high-quality coatings. Radiation-curable coating compositions are generally flowable formulations based on polymers or oligomers containing crosslinking-active groups which on exposure to UV radiation undergo a crosslinking reaction with one another. This results in the formation of a high molecular mass network and thus in the development of a solid polymeric film. Unlike the heat-curable coating compositions often used to date, radiation-curable coating compositions may be used free from solvents or dispersants. They are further notable for very short curing times, which is particularly advantageous in the case of continuous processing on coating lines.

Coating compositions curable by UV radiation generally give high surface hardness and good chemical resistance. For some time there has been a desire for coatings which possess high scratch resistance, so that when it is cleaned, for example, the coating is not damaged and does not lose its gloss. At the same time, the coatings should retain the properties normally achieved with radiation-cured coatings.

In the literature there have been various descriptions of the physical processes involved in the appearance of scratches and the relationships between scratch resistance and other physical parameters of the coating (on scratch-resistant coatings cf., e.g., J. L. Courter, $23^{rd}$ Annual International Waterborne, High-Solids and Powder Coatings Symposium, New Orleans 1996).

A variety of test methods have been described to quantify the scratch resistance of a coating. Examples include testing by means of the BASF brush test (P. Betz and A. Bartelt, Progress in Organic Coatings 22 (1993) 27–37), by means of the AMTEC wash brush installation, or various test methods analogous to scratch hardness measurements, as described for example by G. Jüttner, F. Meyer, G. Menning, Kunststoffe 88 (1988) 2038–42. A further test to determine scratch resistance is described in European Coatings Journal 4/99, 100 to 106.

In accordance with the present state of development, three routes to scratch-resistant surfaces are being discussed, which in principle may also be transferred to UV-curing systems.

The first route is based on increasing the hardness of the coating material. Since a harder material cannot be scratched by a softer one, a high level of hardness is a sufficient prerequisite for scratch resistance. However, the high level of hardness is at the expense of other properties, such as the penetration depth or the adhesion, which are vital to coating materials.

The second route is based on selecting the coating material such that on scratching it is stressed in the reversible deformation range. The materials involved are those which permit high reversible deformation. However, there are limits on the use of elastomers as coating materials. Coatings of this kind usually exhibit poor chemical stability. This approach has to date played no part in practical application.

A third approach attempts to produce coatings having a ductile, i.e., plastic deformation behavior and at the same time to minimize the shear stress within the coating material that occurs on scratching. This is done by reducing the friction coefficient, using waxes or slip additives, for example. Coatings additives for UV-curing systems are described, for example, in B. Hackl, J. Dauth, M. Dreyer; Farbe & Lack 103 (1997) 32–36.

U.S. Pat. No. 5,700,576 describes a UV-curing, scratch-resistant coating which comprises 1–30% by weight of a prepolymeric thickener containing thiol groups and 20–80% by weight of one or more polyfunctional acrylates or methacrylates, and also diluents, especially reactive diluents containing a free-radically polymerizable group, free-radical initiators, and further customary additives for producing coatings. The polymerization and thus curing of the coating is initiated by irradiation with UV light.

EP 0 544 465 B1 describes a UV-curable, scratch-resistant coating whose hardness is increased by incorporating colloidal silica into the coating matrix, the intention being at the same time to retain the flexibility of the organic matrix. A scratch-resistant coating of this kind contains 1–60% by weight of colloidal silica, 1–50% by weight of the hydrolysis product of an alkoxysilyl acrylate, especially 3-methacryloyloxypropyltrimethoxysilane, and 25–90% by weight of acrylate monomers, comprising a mixture of 20–90% by weight of hexanediol diacrylate and 10–80% by weight of a monofunctional branched or carbocyclic acrylate, and also a sufficient amount of free-radical initiator.

It is an object of the present invention to provide a process for producing scratch-resistant and weathering-stable coatings on the basis of UW-curable coating compositions.

We have found that this object is achieved, surprisingly, by a process which involves applying a liquid, UV-curable coating composition based on aliphatic urethane (meth)acrylate prepolymers to the target substrate and curing the still-wet coating subsequently by UV radiation in the substantial absence of oxygen.

The present invention accordingly provides a process for producing scratch-resistant coatings, which involves applying at least one UV-curable coating composition comprising as its photochemically crosslinkable constituent at least one aliphatic urethane (meth)acrylate prepolymer PU having at least two double bonds per molecule, or a mixture of at least one urethane (meth)acrylate prepolymer PU and at least one reactive diluent, to the target substrate and curing the resulting wet coating by exposure to ultraviolet radiation under an inert gas atmosphere.

The term inert gas atmosphere refers to an essentially oxygen-free atmosphere of chemically inert gases, such as nitrogen, carbon-monoxide, carbon dioxide and noble gases, e.g., argon, or mixtures of said gases. Inert gases generally contain not more than 2000 ppm of impurities and normally not more than 500 ppm of oxygen. These slight traces of oxygen do not impair the effect of the invention. Even amounts of oxygen of up to 2% by volume do not detract from the effect of the invention. Higher grades of nitrogen contain less than 10 ppm of oxygen. Typical argon grades contain less than 6 ppm of oxygen. The preferred inert gas is nitrogen.

The UV-curable coating compositions used in the process of the invention comprise as their photochemically crosslinkable constituents and, accordingly, their film formers at least one aliphatic urethane (meth)acrylate prepolymer PU having at least two double bonds per molecule, or a mixture of such prepolymers PU with at least one reactive diluent, selected preferably from difunctional and polyfunctional esters of acrylic acid and/or of methacrylic acid with aliphatic diols or polyols (reactive diluent R).

Aliphatic urethane (meth)acrylate prepolymers are polymeric or oligomeric compounds which have urethane groups and acryloxyalkyl and/or methacryloxyalkyl groups or (meth)acrylamidoalkyl groups. Normally, the (meth) acryloxyalkyl and/or (meth)acrylamidoalkyl groups are attached via the oxygen atom of the urethane group. The term acryloxyalkyl groups refers to $C_1$–$C_{10}$ alkyl radicals, preferably $C_2$–$C_5$ alkyl radicals, substituted by one, two or three, preferably one, acryloxy group. Similar comments apply to methacryloxyalkyl groups. Accordingly, (meth) acrylamidoalkyl groups are $C_1$–$C_{10}$ alkyl radicals, preferably $C_2$–$C_5$ alkyl radicals, substituted by one, two or three (meth)acrylamido groups, preferably by one (meth) acrylamido group. In accordance with the invention, the aliphatic urethane (meth)acrylate prepolymers PU have at least two double bonds per molecule, preferably from three to six double bonds per molecule. The aliphatic urethane (meth)acrylate prepolymers PU of the invention are essentially free from aromatic structural elements, such as phenylene or naphthylene or substituted phenylene or naphthylene groups.

The urethane (meth)acrylate prepolymers or oligomers PU used as binders normally have a number-average molecular weight $M_N$ in the range from 500 to 5000, preferably in the range from 500 to 2000 daltons (as determined by means of GPC on the basis of authentic comparison samples). The double bond equivalent weight (g of polymer per double bond present therein) is preferably in the range from 250 to 2000 and in particular in the range from 300 to 900.

The prepolymers PU or mixtures thereof with the reactive diluent R that are employed in accordance with the invention preferably have a viscosity (as determined using a rotational viscometer in accordance with DIN EN ISO 3319) in the range from 250 to 11,000 mPa.s, in particular in the range from 2000 to 7000 mPa.s.

The aliphatic urethane (meth)acrylate prepolymers are known in principle to the skilled worker and may be prepared, for example, as described in EP-A-203 161. The content of that document, insofar as it relates to urethane (meth)acrylate prepolymers and their preparation, is hereby incorporated fully by reference.

Urethane (meth)acrylate prepolymers preferred for use in accordance with the invention are obtainable by reacting at least 25% of the isocyanate groups of a compound (component A) containing isocyanate groups with at least one hydroxyalkyl ester of acrylic acid and/or of methacrylic acid (component B) and, if desired, with one or more further compounds (component C) having at least one functional group which is reactive toward isocyanate groups.

The relative amounts of components A, B and C are preferably chosen such that
1. the ratio of equivalents of the isocyanate groups in component A to the reactive groups in component C is between 3:1 and 1:2, preferably between 3:1 and 1.1:1, and in particular about 2:1, and
2. the hydroxyl groups of component B correspond to the stoichiometric amount of the free isocyanate groups of component A, i.e., to the difference between the total number of isocyanate groups of component A minus the reactive groups of component C (or minus its reacted reactive groups of component C if only partial reaction of the reactive groups is intended).

Preferably, the binder contains no free isocyanate groups. In one advantageous embodiment, therefore, component B is reacted in a stoichiometric ratio with the free isocyanate groups of component A.

The urethane (meth)acrylate prepolymers may also be prepared by first reacting some of the isocyanate groups of a low molecular mass diisocyanate or polyisocyanate, as component A, with at least one hydroxyalkyl ester of an ethylenically unsaturated carboxylic acid, as component B, and subsequently reacting the remaining isocyanate groups with a chain extender (component C1). In this case it is also possible to use mixtures of chain extenders. In this case also, the relative amounts of components A, B and C are chosen such that the ratio of equivalents of the isocyanate groups to the reactive groups of the chain extender is between 3:1 and 1:2, preferably 2:1, and the ratio of equivalents of the remaining isocyanate groups to the hydroxyl groups of the hydroxyalkyl ester is 1:1.

Compounds containing isocyanate groups are understood, here and below, to be low molecular mass, aliphatic diisocyanates or polyisocyanates and also aliphatic polymers or oligomers containing isocyanate groups (prepolymers) having at least two and preferably from three to six free isocyanate groups per molecule. The boundary between the low molecular mass diisocyanates or polyisocyanates and the prepolymers containing isocyanate groups is fluid. Typical prepolymers containing isocyanate groups generally have a number-average molecular weight $M_n$ in the range from 300 to 5000 daltons, preferably in the range from 400 to 2000 daltons. The low molecular mass diisocyanates or polyisocyanates preferably have a molecular weight of less than 400 daltons, in particular of less than 300 daltons.

Typical aliphatic diisocyanates or polyisocyanates of low molecular mass are tetramethylene diisocyanate, hexamethylene diisocyanate, octamethylene diisocyanate, decamethylene diisocyanate, dodecamethylene diisocyanate, tetradecamethylene diisocyanate, 1,6-diisocyanato-2,2,4-trimethylhexane, 1,6-diisocyanato-2,2,4,4-tetramethylhexane, 1,2-, 1,3- or 1,4-diisocyanatocyclohexane, 4,4'-di(isocyanatocyclohexyl) methane, 1-isocyanato-3,3,5-trimethyl-5-(isocyanatomethyl)cyclohexane(isophorone diisocyanate), 2,4- or 2,6-diisocyanato-1-methylcyclohexane, and also the biurets, cyanurates and allophanates of the abovementioned diisocyanates.

The polyisocyanates containing isocyanurate groups comprise, in particular, simple triisocyanato isocyanurates, which represent cyclic trimers of the diisocyanates, or comprise mixtures with their higher homologs having more than one isocyanurate ring. Mention may be made here by way of example of the isocyanurate of hexamethylene diisocyanate and of the cyanurate of toluene diisocyanate, which are available commercially. Cyanurates are used preferably in preparing urethane (meth)acrylates.

Oligomers and polymers containing isocyanate groups are obtainable, for example, by reacting one of the abovementioned low molecular mass diisocyanates or polyisocyanates with a compound having at least two functional groups that are reactive toward isocyanate groups. Compounds of this kind are also referred to as chain extenders (component C1) and are included in component C.

Suitable hydroxyalkyl esters of acrylic acid and of methacrylic acid (component B) are the monoesters of acrylic acid and, respectively, of methacrylic acid with $C_2$–$C_{10}$ alkanediols, such as 2-hydroxyethyl acrylate, 2-hydroxyethyl methacrylate, 3-hydroxypropyl acrylate, 3-hydroxypropyl methacrylate, 4-hydroxybutyl acrylate, and 4-hydroxybutyl methacrylate. As well as or in addition to the hydroxyalkyl esters of acrylic acid and/or of methacrylic acid it is also possible to use other hydroxyl-containing esters of acrylic acid and/or of methacrylic acid in order to introduce double bonds into the urethane (meth) acrylate prepolymer PU, such as trimethylolpropane diacrylate or dimethacrylate, and also hydroxyl-carrying amides of acrylic acid and of methacrylic acid, such as 2-hydroxyethylacrylamide and 2-hydroxyethylmethacrylamide.

Suitable chain extenders (component C1) are aliphatic diols or polyols having up to 20 carbon atoms, such as ethylene glycol, diethylene glycol, propylene glycol, dipropylene glycol, 1,4-butanediol, 1,5-pentanediol, neopentyl glycol, 1,6-hexanediol, 2-methyl-1,5-pentanediol, 2-ethyl-1, 4-butanediol, 2,2-bis(4'-hydroxycyclohexyl)propane, dimethylolcyclohexane, glycerol, trimethylolethane, trimethylolpropane, trimethylolbutane, pentaerythritol, trimethylolpropane, erythritol and sorbitol; diamines or polyamines having up to 20 carbon atoms, such as ethylenediamine, 1,3-propanediamine, 1,2-propanediamine, neopentanediamine, hexamethylenediamine, octamethylenediamine, isophoronediamine, 4,4'-diaminodicyclohexylmethane, 3,3'-dimethyl-4,4'-diaminodicyclohexylmethane, 4,7-dioxadecane-1,10-diamine (3,3'-bis[1,2-ethanediylbis(oxy)]-1-propanamine), 4,9-dioxadodecane-1,12-diamine (3,3'-bis[1,3-butanediylbis(oxy)]-1-propanamine), 4,7,10-trioxatridecane-1,13-diamine (3,3'-bis[oxybis(2,1-ethanediyloxy)]-1-propanamine), 2-(ethylamino)ethylamine, 3-(methylamino)propylamine, diethylenetriamine, $N_3$ Amine (N-(2-aminoethyl)-1,3-propylenediamine), dipropylenetriamine or $N_4$ Amine (N,N'-bis(3-aminopropyl)ethylenediamine); alkanolamines having up to 20 carbon atoms, such as monoethanolamine, 2-amino-1-propanol, 3-amino-1-propanol, 2-amino-1-butanol, isopropanolamine, 2-amino-2-methyl-1-propanol, 5-amino-1-pentanol, 2-amino-1-pentanol, 6-aminohexanol, methylaminoethanol, 2-(2-aminoethoxy)ethanol, N-(2-aminoethyl)ethanolamine, N-methylethanolamine, N-ethylethanolamine, N-butylethanolamine, diethanolamine, 3-(2-hydroxyethylamino)-1-propanol or diisopropanolamine; and dimercaptans or polymercaptans having up to 20 carbon atoms, such as 1,2-ethanedithiol, 1,3-propanedithiol, 1,4-butanedithiol, 2,3-butanedithiol, 1,5-pentanedithiol, 1,6-hexanedithiol, 1,8-octanedithiol, 1,9-nonanedithiol, 2,3-dimercapto-1-propanol, dithiothreitol, dithioerythritol, 2-mercaptoethyl ether or 2-mercaptoethyl sulfide. Further suitable chain extenders include oligomeric compounds having two or more of the abovementioned reactive functional groups, examples being hydroxyl-containing oligomers, such as polyethers, polyesters or hydroxyl-containing acrylate/methacrylate copolymers. Oligomeric chain extenders are extensively described in the literature and generally have molecular weights in the range from 200 to 2000 daltons. Preferred chain extenders are the diols or polyols having up to 20 carbon atoms, especially the aliphatic diols having 6 to 20 carbon atoms, examples being ethylene glycol, diethylene glycol, neopentyl glycol, and 1,6-hexanediol.

Component C further includes compounds C2 which flexibilize the UV-cured coating. Flexibilization can be achieved, inter alia, by reacting at least some of the free isocyanate groups of the binder with hydroxyalkyl esters and/or alkylamine amides of relatively long-chain dicarboxylic acids, preferably aliphatic dicarboxylic acids having at least 6 carbon atoms. Examples of suitable dicarboxylic acids are adipic acid, sebacic acid, dodecandioc acid, and/or dimeric fatty acids. The flexibilization reactions may in each case be carried out before or after the addition of component B onto the isocyanato-containing prepolymers. Flexibilization is also achieved by using relatively long-chain aliphatic diols and/or diamines, especially aliphatic diols and/or diamines having at least 6 carbon atoms, as chain extenders C1.

The coating composition may further comprise one or more reactive diluents. Reactive diluents are liquid compounds of low molecular mass which have at least one, polymerizable, ethylenically unsaturated double bond. An overview of reactive diluents can be found, for example, in J. P. Fouassier (ed.), Radiation Curing in Polymer Science and Technology, Elsevier Science Publisher Ltd., 1993, Vol. 1, pp. 237–240. Preference is given to reactive diluents R based on esters of acrylic acid and/or methacrylic acid with aliphatic diols or polyols, at least two of the OH groups of the diols or polyols having been esterified with acrylic and/or methacrylic acid (reactive diluents R). Suitable aliphatic diols or polyols generally have 2 to 20 carbon atoms and may have a linear, branched or cyclic carbon framework. They contain preferably no functional groups. Apart from one or two ether oxygens, they preferably have no heteroatoms. Examples of reactive diluents of this kind are butanediol diacrylate, hexanediol diacrylate, octanediol diacrylate, decanediol diacrylate, cyclohexanediol diacrylate, trimethylolpropane triacrylate, pentaerythritol tetraacrylate, dipentaerythritol penta/hexaacrylate, dipropylene glycol diacrylate, and also the corresponding esters of methacrylic acid, and the products LR 8887, PO 33F, LR 8967, LR 8982 available under the BASF brand name Laromer®.

In addition, the coating composition used in accordance with the invention may comprise further reactive diluents other than the abovementioned reactive diluents R. Such reactive diluents are likewise mono-, di- or polyunsaturated compounds. They usually serve to influence the viscosity and the coatings properties, such as the crosslinking density, for example. Examples of such compounds are (meth)acrylic acid and the $C_1$–$C_{10}$ alkyl esters thereof, maleic acid and its $C_1$–$C_{10}$ alkyl esters and monoesters, vinyl acetate, vinyl ethers, divinylureas, polyethylene glycol di(meth)acrylate, vinyl (meth)acrylate, allyl (meth)acrylate, styrene, vinyltoluene, divinylbenzene, tris(acryloyloxymethyl)isocyanurate, ethoxyethoxyethyl acrylate, N-vinylpyrrolidone, phenoxyethyl acrylate, dimethylaminoethyl acrylate, hydroxyethyl (meth)acrylate, butoxyethyl acrylate, isobornyl (meth)acrylate, dimethylacrylamide and dicyclopentyl acrylate, and also the long-chain linear diacrylates described in EP 0 250 631 A1 having a molecular weight of from 400 to 4000, preferably from 600 to 2500 daltons. Also suitable for use, moreover, is the reaction product of 2 mols of acrylic acid with one mol of a dimeric fatty alcohol generally having 36 carbon atoms. Mixtures of said monomers are also suitable.

The scratch-resistant, weathering-stable coating compositions generally include from 0.1 to 5% by weight, preferably from 0.1 to 2% by weight, in particular from 0.2 to 1% by weight, of at least one photoinitiator, which is able to initiate the polymerization of ethylenically unsaturated double bonds. Such initiators include benzophenone and derivatives of benzophenone, such as 4-phenylbenzophenone and 4-chlorobenzophenone, Michler's ketone, anthrone, acetophenone derivatives, such as 1-benzoylcyclohexan-1-ol, 2-hydroxy-2,2-dimethylacetophenone and 2,2-dimethoxy-2-phenylacetophenone, benzoin and benzoin ethers, such as methyl, ethyl and butyl benzoin ether, benzil ketals, such as benzil dimethyl ketal, 2-methyl-1-(4-methylthiophenyl)-2-morpholinopropan-1-one, anthraquinone and its derivatives, such as β-methylanthraquinone and tert-butylanthraquinone, acylphosphine oxides, such as 2,4,6-trimethylbenzoyldiphenylphosphine oxide, ethyl 2,4,6-trimethylbenzoylphenylphosphinate, and bisacylphosphine oxides. Initiators of this kind are, for example, the products available commercially under the brand names Irgacure® 184, Darocure® 1173 from Ciba Geigy, Genocure® from Rahn, or Lucirin® TPO from BASF AG. Preferred photoinitiators also include phenylglyoxalic acid, its esters and its salts, which may also be used in combination with one of the abovementioned photoinitiators. For further details reference may hereby be made to German Patent Application P 198 267 12.6 in its entirety.

Furthermore, depending on their intended use, the radiation-curable formulations of the invention may contain up to 35% by weight of customary auxiliaries, such as thickeners, leveling assistants, defoamers, UV stabilizers, lubricants, and fillers. Suitable auxiliaries are sufficiently well known to the skilled worker from the technology of paints and coatings. Appropriate fillers comprise silicates, e.g., silicates obtainable by hydrolysis of silicon tetrachloride, such as Aerosil® from Degussa, siliceous earth, talc, aluminum silicates, magnesium silicates, calcium carbonates, etc. Suitable stabilizers include typical UV absorbers, such as oxanilides, triazines and benzotriazole (the latter obtainable as Tinuvin® grades from Ciba-Spezialitätenchemie), and benzophenones. These may be used alone or together with appropriate free-radical scavengers, examples being sterically hindered amines, such as 2,2,6,6-tetramethylpiperidine, 2,6-di-tert-butylpiperidine or derivatives thereof, e.g., bis(2,2,6,6-tetramethyl-4-piperidyl)sebacate. Stabilizers are used commonly in amounts of from 0.1 to 5.0% by weight and preferably from 0.5 to 3.5% by weight, based on the coating composition.

Based on the overall weight of the coating composition, excluding pigments and fillers, the coating compositions used in accordance with the invention preferably contain:

10–95% by weight, in particular from 20 to 90% by weight and especially from 30 to 80% by weight, of at least one aliphatic urethane (meth)acrylate prepolymer PU;

5–90% by weight, in particular from 10 to 80% by weight and especially from 20 to 70% by weight, of at least one reactive diluent R;

0.1–5% by weight of at least one photoinitiator; and, if desired,

0–20% by weight of further reactive diluents, and

0–15% by weight, preferably 2–9% by weight, of additives customary for coating compositions.

The total amount of reactive diluent is preferably not more than 80% by weight. If a diacrylate or dimethacrylate is used as reactive diluent R, the coating composition contains in particular from 20 to 80% by weight of reactive diluent and especially this reactive diluent R as sole reactive diluent. If a compound having more than two acrylate or methacrylate groups is used as reactive diluent R, then R is used preferably in an amount of from 5 to 60% by weight, more preferably from 10 to 50% by weight.

The above-described coating compositions are liquid formulations and as such may be applied in the customary manner without addition of solvents.

The inventive coating compositions are particularly used in the form of clearcoats, so that they normally contain no fillers, or only transparent fillers, and no hiding pigments. Use in the form of pigmented coating compositions is, however, also possible. In that case the coating compositions contain from 2 to 40% by weight, based on the overall weight of the coating composition, of one or more pigments.

Furthermore, in this case the coating compositions may contain from 1 to 30% by weight, based on the overall weight of the coating composition, of one or more fillers.

The coatings of the invention may also be applied in aqueous form. For this purpose, either some of the isocyanate groups are reacted with molecules having an isocyanate reactive group and a hydrophilic, stabilizing group, such as carboxylate or sulfonate, examples being dimethylolpropionic acid, hydroxypivalic acid, and sarcosine. Subsequently, the reaction product is neutralized with alkali or amines and the binder is dispersed in the coating composition or emulsified with protective colloids.

The coating compositions of the invention may be applied to glass and the various metal substrates, such as, for example, aluminum, steel, various ferrous alloys, and the like. They are preferably used as a clearcoat or topcoat, for example, in the coil-coating segment and in the segment of automotive topcoats.

The coating compositions may also be applied to other substrates, such as wood, paper, plastics, mineral substrates, and the like. Furthermore, they may be used as a coating on packaging containers and also for coatings for films, for example, for the furniture industry.

To produce coatings on metal substrates, the coating compositions of the invention are applied preferably to primed or basecoated metal panels or metal strips. The commonly used basecoat materials may be used as primers. Both conventional and aqueous basecoat materials are employed. Further, it is also possible to apply the coating compositions of the invention to metal substrates which are first coated with an electrodeposition coating and subsequently coated with a functional coat and wet-on-wet with a basecoat material. In the case of said processes it is generally necessary for the basecoat material and the surfacer and/or the functional coat to be baked before the coating composition of the invention is applied.

The process of the invention for producing multicoat coating systems comprises the following steps:

applying a preferably pigmented basecoat material to a substrate surface;

drying and/or crosslinking the basecoat film;

applying a topcoat material; and curing the topcoat by exposure to UV light under an inert gas atmosphere.

The topcoat material used here is a coating composition based on urethane (meth)acrylate prepolymers PU, as described above.

The coating films are cured by means of UV radiation under an inert gas atmosphere. The installations and conditions for such curing methods are known from the literature (cf., e.g., Holmes, UV and EB Curing Formulations for Printing Inks, Coatings and Paints, SITA Technology, Academic Press, London, United Kingdom 1984).

The coatings obtainable in accordance with the invention are notable for good surface hardness and a higher scratch resistance than conventionally cured coatings. They are also notable for improved chemical resistance.

The chemical resistance is normally tested with the chemicals with which the coating may come into contact. In the case of wood coatings, these are, for example, typical household chemicals, such as coffee, mustard or red wine, whereas coatings for motor vehicles are tested for their resistance to gasoline, acids, alkalis, tree resin, etc. The coatings of the invention exhibit a markedly improved resistance to the aforementioned chemicals.

In the text below, the invention is illustrated with reference to working examples. All parts in the examples are by weight unless expressly stated otherwise.

1. Preparation of the Urethane Acrylate Coating Compositions

The coating compositions are prepared from the components indicated in Table 1 by thorough stirring using a dissolver or a stirrer. Films were produced on cleaned glass plates using a box-type coating bar, gap size 200 µm. The films are cured in an IST coating unit (type M 40 2×1-R-IR-SLC-So inert) with 2 UV emitters (high-pressure mercury vapor lamps type M 400 U2H and type M400 U2HC)

and a conveyor belt running speed of 10 m/min. The radiation dose is approximately 1800 mJ/cm².

TABLE 1

Composition of coating compositions 1–11

| Coating composition | LR 8987 (1) | THEIC (2) | PHA (3) | HDDA (4) | Irgacure 184 (5) |
|---|---|---|---|---|---|
| 1 | 100 | | | | 4 |
| 2 | 90 | 10 | | | 4 |
| 3 | 70 | 30 | | | 4 |
| 4 | 50 | 50 | | | 4 |
| 5 | 95 | | 5 | | 4 |
| 6 | 90 | | 10 | | 4 |
| 7 | 80 | | 20 | | 4 |
| 8 | 50 | | 50 | | 4 |
| 9 | 80 | | | 20 | 4 |
| 10 | 50 | | | 50 | 4 |
| 11 | 20 | | | 80 | 4 |

(1) Laromer ® LR 8987: commercial mixture of an aliphatic urethane acrylate containing 30% by weight hexanediol diacrylate, from BASF AG. Molecular weight approximately 650 g/mol, Functionality approximately 2.8 double bonds/mol (about 4.5 mol/kg), Viscosity 2–6 Pa · s (DIN EN ISO 3219).
(2) THEIC: triacrylate of tri(hydroxyethyl)cyanurate
(3) PHA: dipentaerythritol penta/hexaacrylate
(4) HDDA: hexanediol diacrylate
(5) Irgacure ® 184 from Ciba Geigy, commercial photoinitiator.

2. Determination of the Mechanical Stability

The pendulum hardness in accordance with König, DIN 53 157, ISO 1522, the Erichsen indentation in accordance with DIN 53 156, ISO 1520 and scratch resistance using the Scotch Brite test after storage for 24 hours in a controlled-climate chamber were determined for the coating compositions listed in Table 1.

To determine the scratch resistance, a film was applied to a cleaned glass plate colored black. This permits the loss of gloss to be determined following corresponding stress. Curing with UV radiation was carried out under a nitrogen atmosphere (Table 2a) and also under air (Table 2b).

In the Scotch Brite test, the test specimen is a 3×3 cm silicon carbide-modified fiber nonwoven (Scotch Brite SUFN, 3M Deutschland, 41453 Neuβ) mounted on a cylinder. This cylinder presses the fiber nonwoven against the coating under a load of 750 g and is moved over the coating pneumatically. The path of the deflection is 7 cm. After 10 or 50 double strokes (DS), the gloss (6-fold determination) in the central region of the stress is measured in analogy to DIN 67530, ISO 2813 at an incident angle of 60° and the difference from the gloss value prior to treatment is formed (Δ gloss value). The Δ gloss value is inversely proportional to the scratch resistance.

TABLE 2a

Test results of coatings 1 to 11 on curing under a nitrogen atmosphere ($O_2 \leq 500$ ppm, determined by means of a Galvanoflux probe - electrochemical cell based on a lead/lead oxide redox couple)

| Example | Scratch resistance[1] (Δ gloss value) | | Pendulum attenuation[2] | Erichsen indentation[3] |
|---|---|---|---|---|
| | 10 DS | 50 DS | (s) | (mm) |
| 1 | 4.5 | 6.1 | 172 | 3.5 |
| 2 | 3.3 | 6.3 | 176 | 0.7 |
| 3 | 5.4 | 9.1 | 189 | 0.9 |
| 4 | 3.9 | 6.0 | 189 | 0.9 |
| 5 | 3.1 | 5.1 | 181 | 0.9 |
| 6 | 2.7 | 4.3 | 175 | 0.8 |
| 7 | 2.2 | 3.7 | 183 | 0.6 |
| 8 | 0.6 | 1.3 | 182 | 0.5 |
| 9 | 3.7 | 5.5 | 178 | 2.3 |
| 10 | 2.7 | 6.0 | 172 | 1.2 |
| 11 | 2.0 | 5.1 | 185 | 0.8 |

TABLE 2b

Test results of coatings 1 to 11 on curing under air (Examples V1 to V11)

| Example | Scratch resistance[1] (Δ gloss value) | | Pendulum attenuation[2] | Erichsen indentation[3] |
|---|---|---|---|---|
| | 10 DS | 50 DS | (s) | (mm) |
| V1 | 38.2 | 33.8 | 175 | 3.3 |
| V2 | 31.4 | 39.1 | 171 | 3.0 |
| V3 | 21.9 | 39.4 | 186 | 3.2 |
| V4 | 20.5 | 35.6 | 186 | 1.5 |
| V5 | 26.2 | 37.5 | 176 | 2.5 |
| V6 | 30.0 | 40.8 | 171 | 2.1 |
| V7 | 22.5 | 35.0 | 182 | 0.8 |
| V8 | 8.3 | 14.8 | 175 | 0.6 |
| V9 | 40.6 | 41.5 | 165 | 3.0 |
| V10 | n.m.[4] | n.m.[4] | 174 | 2.2 |
| V11 | n.m.[4] | n.m.[4] | n.m.[4] | n.m.[4] |

[1]Δ gloss after Scotch-Brite treatment after 10 and 50 double strokes (DS), respectively
[2]König pendulum hardness, DIN 53 157, ISO 1522
[3]Erichsen indentation, DIN 53 156, ISO 1520
[4]not measurable 3. Testing of Resistance to Chemicals The coatings with the compositions of Examples 1 and 8 from Table 1 are applied in a film thickness of approximately 40 μm to a metal panel and cured under the stated atmosphere with a belt speed of 10 m/min under 120 W lamps. The stated chemicals were applied dropwise in series and the panel was placed in a gradient oven with a temperature zone of 25 to 90° C. for one hour. The table reports the lowest temperature at which damage occurs to the film surface; inspection after 24 hours.

TABLE 3

Chemical resistance on curing under air and under nitrogen

| Example (atmosphere) | 1 (Air) | 1 (Nitrogen) | 8 (Air) | 8 (Nitrogen) |
|---|---|---|---|---|
| Water | 75 | 75 | 75 | 75 |
| Tree resin | 34 | 75 | 75 | 75 |
| Pancreatin/Water 1:1 | 51 | 63 | 36 | 60 |
| Sulfuric acid 1% | 42 | 66 | 67 | 66 |

135/ew/sg

We claim:

1. A process for producing a scratch-resistant coating, said process comprising:
   applying at least one UV-curable coating composition comprising a mixture of at least one aliphatic urethane (meth)acrylate prepolymer having at least two double bonds per molecule and having a viscosity in the range from 250 to 11,000 mPa.s, and at least one reactive diluent, to a substrate to form a wet coating and curing said wet coating by exposure to ultraviolet radiation under an inert gas atmosphere, wherein the aliphatic urethane prepolymer is obtained by reacting at least 25% of the isocyanate groups of a compound (A) containing at least two isocyanate groups per molecule with (B) at least one hydroxy alkyl ester of acrylic acid, methacrylic acid or both acrylic acid and methacrylic acid, and subsequently reacting any remaining isocyanate groups of (A) with a chain extender (C) selected from the group consisting of an aliphatic diol having up to 20 carbon atoms, a polyol having up to 20 carbon atoms, a diamine having up to 20 carbon atoms, a polyamine having up to 20 carbon atoms, an alkanolamine having up to 20 carbon atoms, a dimercaptan having up to 20 carbon atoms, a polymercaptan having up to 20 carbon atoms, a hydroxyalkylester of a long-chain dicarboxylic acid, and an alkylamineamide of a long chain dicarboxylic acid, wherein component (A) is obtained by reacting at least one of a low molecular mass aliphatic diisocyanate or polyisocyanate with a compound having at least two isocyanate-reactive functional groups wherein the ratio of the isocyanate groups of component (A) to the functional groups of the compound is in the range of from 3:1 to 1:2.

2. The process as claimed in claim 1, wherein said UV-curable coating composition further comprises at least one reactive diluent selected from the group consisting of difunctional esters of acrylic acid, difunctional esters of methacrylic acid, polyfunctional esters of methacrylic acid, polyfunctional esters of acrylic acid with acrylic acid, diols, polyols and mixtures thereof.

3. The process as claimed in claim 1, wherein, based on an overall weight of the coating composition, excluding pigments and fillers, the coating composition comprises:
   5–90% by weight of at least one aliphatic urethane (meth)acrylate prepolymer;
   10–95% by weight of the reactive diluent; and
   0.1–5% by weight of at least one photoinitiator.

4. The process as claimed in claim 1, wherein the urethane (meth)acrylate prepolymer has a number-average molecular weight in the range from 500 to 5000.

5. The process as claimed in claim 1, wherein the urethane (meth)acrylate prepolymer has a double bond equivalent weight in the range from 250 to 2000.

6. The process as claimed in claim 1 wherein at least a portion of the free isocyanate groups of the urethane (meth)acrylate prepolymer have been reacted with one or more molecules which contain an isocyanate-reactive group and a hydrophilic, stabilizing group.

7. The process as claimed in claim 1, wherein the coating composition further comprises from 2 to 40% by weight of one or more pigments, based on the overall weight of the coating composition.

8. The process as claimed in claim 1, wherein the coating composition further comprises from 1 to 30% by weight of one or more fillers, based on the overall weight of the coating composition.

9. The process as claimed in claim 1, wherein the scratch-resistant coating is obtained by a multicoat coating process, said multicoat coating process comprising:
   i. applying a basecoat material to a substrate surface;
   ii. drying and/or crosslinking the basecoat film;
   iii. applying the UV-curable coating composition; and
   iv. curing the UV-curable coating composition by exposure to UV light under an inert gas atmosphere.

10. The process as claimed in claim 1, wherein the substrate has a metallic surface.

11. The process as claimed in claim 3, wherein the coating composition further comprises from 2 to 9% by weight of one or more additives.

12. The process as claimed in claim 5, wherein the aliphatic urethane (meth)acrylate prepolymer has a double bond equivalent weight in the range from 300 to 900 daltons.

13. The process as claimed in claim 9, wherein the basecoat material is pigmented.

14. The process as claimed in claim 1, wherein said UV-curable coating composition comprises a reactive diluent comprising at least one esterified polyol having five or more acrylate groups.

15. The process as claimed in claim 1, wherein the urethane prepolymer consists of reacted units of (A), (B), and (C).

16. The process as claimed in claim 3, wherein the coating composition further comprises up to 15% by weight of one or more additives.

17. The process as claimed in claim 3, wherein the coating composition further comprises up to 20% by weight of one or more further diluents.

18. A scratch resistant coating prepared by the process as claimed in claim 1.

19. The process as claimed in claim 1, wherein said UV-curable coating composition comprises dipentaerythritol penta/hexaacrylate.

20. A process for producing a scratch-resistant coating, said process comprising:
   applying at least one UV-curable coating composition comprising a mixture of at least one aliphatic urethane (meth)acrylate prepolymer having at least two double bonds per molecule and having a viscosity in the range from 250 to 11,000 mPa.s and wherein at least a portion of the free isocyanate groups of the urethane (meth) acrylate prepolymer have been reacted with one or more of a hydroxyalkyl ester of an aliphatic dicarboxylic acid having at least 6 carbon atoms or an alkylamine amide of an aliphatic dicarboxylic acid having at least 6 carbon atoms, and at least one reactive diluent, to a substrate to form a wet coating and
   curing said wet coating by exposure to ultraviolet radiation under an inert gas atmosphere,
   wherein the aliphatic urethane prepolymer is obtained by reacting at least 25% of the isocyanate groups of a compound (A) containing isocyanate groups with (B) at least one hydroxy alkyl ester of acrylic acid, methacrylic acid or both acrylic acid and methacrylic acid, and subsequently reacting any remaining isocyanate groups of (A) with a chain extender (C) selected from the group consisting of an aliphatic diol having up to 20 carbon atoms, a polyol having up to 20 carbon atoms, a diamine having up to 20 carbon atoms, a polyamine having up to 20 carbon atoms, an alkanolamine having up to 20 carbon atoms, a dimercaptan having up to 20 carbon atoms, a polymercaptan having up to 20 carbon atoms, a hydroxyalkylester of a long-chain dicarboxylic acid, and an alkylamineamide of a long chain dicarboxylic acid.

21. The process as claimed in claim 20, wherein said UV-curable coating composition further comprises at least one reactive diluent selected from the group consisting of difunctional esters of acrylic acid, difunctional esters of methacrylic acid, polyfunctional esters of methacrylic acid, polyfunctional esters of acrylic acid with acrylic acid, diols, polyols and mixtures thereof.

22. The process as claimed in claim 20, wherein, based on an overall weight of the coating composition, excluding pigments and fillers, the coating composition comprises:
- 5–90% by weight of at least one aliphatic urethane (meth)acrylate prepolymer;
- 10–95% by weight of the reactive diluent; and
- 0.1–5% by weight of at least one photoinitiator.

23. The process as claimed in claim 20, wherein the urethane (meth)acrylate prepolymer has a number-average molecular weight in the range from 500 to 5000.

24. The process as claimed in claim 20, wherein the urethane (meth)acrylate prepolymer has a double bond equivalent weight in the range from 250 to 2000.

25. The process as claimed in claim 20, wherein the one or more isocyanate groups of component A have been reacted in a stoichiometric ratio with one or more hydroxyl groups of component B.

26. The process as claimed in claim 20, wherein at least a portion of the free isocyanate groups of the urethane (meth)acrylate prepolymer have been reacted with one or more molecules which contain an isocyanate-reactive group and a hydrophilic, stabilizing group.

27. The process as claimed in claim 20, wherein the coating composition further comprises from 2 to 40% by weight of one or more pigments, based on the overall weight of the coating composition.

28. The process as claimed in claim 20, wherein the coating composition further comprises from 1 to 30% by weight of one or more fillers, based on the overall weight of the coating composition.

29. The process as claimed in claim 20, wherein the scratch-resistant coating is obtained by a multicoat coating process, said multicoat coating process comprising:
   i. applying a basecoat material to a substrate surface;
   ii. drying and/or crosslinking the basecoat film;
   iii. applying the UV-curable coating composition; and
   iv. curing the UV-curable coating composition by exposure to UV light under an inert gas atmosphere.

30. The process as claimed in claim 20, wherein the substrate has a metallic surface.

31. The process as claimed in claim 22, wherein the coating composition further comprises from 2 to 9% by weight of one or more additives.

32. The process as claimed in claim 24, wherein the aliphatic urethane (meth)acrylate prepolymer has a double bond equivalent weight in the range from 300 to 900 daltons.

33. The process as claimed in claim 30, wherein the basecoat material is pigmented.

34. The process as claimed in claim 20, wherein said UV-curable coating composition comprises a reactive diluent comprising at least one esterified polyol having five or more acrylate groups.

35. The process as claimed in claim 20, wherein the aliphatic urethane prepolymer comprises reacted groups of a diamine or a polyamine.

36. The process as claimed in claim 20, wherein the urethane prepolymer consists of reacted units of (A), (B), and (C).

37. The process as claimed in claim 22, wherein the coating composition further comprises up to 15% by weight of one or more additives.

38. The process as claimed in claim 22, wherein the coating composition further comprises up to 20% by weight of one or more further diluents.

39. A scratch resistant coating prepared by the process as claimed in claim 20.

40. The process as claimed in claim 20, wherein said UV-curable coating composition comprises dipentaerythritol penta/hexaacrylate.

41. A process for producing a scratch-resistant coating, said process comprising:
   applying at least one UV-curable coating composition comprising a mixture of at least one aliphatic urethane (meth)acrylate prepolymer comprising reacted groups of a diamine or a polyamine and having at least two double bonds per molecule and having a viscosity in the range from 250 to 11,000 mPa.s, and at least one reactive diluent, to a substrate to form a wet coating and curing said wet coating by exposure to ultraviolet radiation under an inert gas atmosphere,
   wherein the aliphatic urethane prepolymer is obtained by reacting at least 25% of the isocyanate groups of a compound (A) containing isocyanate groups with (B) at least one hydroxy alkyl ester of acrylic acid, methacrylic acid or both acrylic acid and methacrylic acid, and subsequently reacting any remaining isocyanate groups of (A) with a chain extender (C) selected from the group consisting of an aliphatic diol having up to 20 carbon atoms, a polyol having up to 20 carbon atoms, a diamine having up to 20 carbon atoms, a polyamine having up to 20 carbon atoms, an alkanolamine having up to 20 carbon atoms, a dimercaptan having up to 20 carbon atoms, a polymercaptan having up to 20 carbon atoms, a hydroxyalkylester of a long-chain dicarboxylic acid, and an alkylamineamide of a long chain dicarboxylic acid.

42. The process as claimed in claim 41, wherein said UV-curable coating composition further comprises at least one reactive diluent selected from the group consisting of difunctional esters of acrylic acid, difunctional esters of methacrylic acid, polyfunctional esters of methacrylic acid, polyfunctional esters of acrylic acid with acrylic acid, diols, polyols and mixtures thereof.

43. The process as claimed in claim 41, wherein, based on an overall weight of the coating composition, excluding pigments and fillers, the coating composition comprises:
- 5–90% by weight of at least one aliphatic urethane (meth)acrylate prepolymer,
- 10–95% by weight of the reactive diluent; and
- 0.1–5% by weight of at least one photoinitiator.

44. The process as claimed in claim 41, wherein the urethane (meth)acrylate prepolymer has a number-average molecular weight in the range from 500 to 5000.

45. The process as claimed in claim 41, wherein the urethane (meth)acrylate prepolymer has a double bond equivalent weight in the range from 250 to 2000.

46. The process as claimed in claim 41, wherein the one or more isocyanate groups of component A have been reacted in a stoichiometric ratio with one or more hydroxyl groups of component B.

47. The process as claimed in claim 41, wherein at least a portion of the free isocyanate groups of the urethane (meth)acrylate prepolymer have been reacted with one or more molecules which contain an isocyanate-reactive group and a hydrophilic, stabilizing group.

48. The process as claimed in claim 41, wherein the coating composition further comprises from 2 to 40% by weight of one or more pigments, based on the overall weight of the coating composition.

49. The process as claimed in claim 41, wherein the coating composition further comprises from 1 to 30% by weight of one or more fillers, based on the overall weight of the coating composition.

50. The process as claimed in claim 41, wherein the scratch-resistant coating is obtained by a multicoat coating process, said multicoat coating process comprising:
  i. applying a basecoat material to a substrate surface;
  ii. drying and/or crosslinking the basecoat film;
  iii. applying the UV-curable coating composition; and
  iv. curing the UV-curable coating composition by exposure to UV light under an inert gas atmosphere.

51. The process as claimed in claim 41, wherein the substrate has a metallic surface.

52. The process as claimed in claim 43, wherein the coating composition further comprises from 2 to 9% by weight of one or more additives.

53. The process as claimed in claim 45, wherein the aliphatic urethane (meth)acrylate prepolymer has a double bond equivalent weight in the range from 300 to 900 daltons.

54. The process as claimed in claim 50, wherein the basecoat material is pigmented.

55. The process as claimed in claim 41, wherein said UV-curable coating composition comprises a reactive diluent comprising at least one esterified polyol having five or more acrylate groups.

56. The process as claimed in claim 41, wherein the urethane prepolymer consists of reacted units of (A), (B), and (C).

57. The process as claimed in claim 43, wherein the coating composition further comprises up to 15% by weight of one or more additives.

58. The process as claimed in claim 43, wherein the coating composition further comprises up to 20% by weight of one or more further diluents.

59. A scratch resistant coating prepared by the process as claimed in claim 41.

60. The process as claimed in claim 41, wherein said UV-curable coating composition comprises dipentaerythritol penta/hexaacrylate.

* * * * *